(12) United States Patent
Friedrich

(10) Patent No.: US 7,609,147 B2
(45) Date of Patent: Oct. 27, 2009

(54) METHOD AND APPARATUS FOR IMPROVING WIRELESS DATA TRANSMISSION

(75) Inventor: Ulrich Friedrich, Ellhofen (DE)

(73) Assignee: Atmel Automotive GmbH, Heilbronn (DE)

( * ) Notice: Subject to any disclaimer, the term of this patent is extended or adjusted under 35 U.S.C. 154(b) by 430 days.

(21) Appl. No.: 11/087,871

(22) Filed: Mar. 24, 2005

(65) Prior Publication Data
US 2005/0212693 A1   Sep. 29, 2005

(30) Foreign Application Priority Data
Mar. 25, 2004   (DE) .................. 10 2004 014 563

(51) Int. Cl.
*G01S 13/74* (2006.01)

(52) U.S. Cl. .............. 340/10.3; 340/10.1; 340/10.5; 340/572.1

(58) Field of Classification Search ........... 340/10.5, 340/10.1, 572.1, 572.2, 572.4; 370/465, 370/468, 349, 350; 375/354, 229, 232
See application file for complete search history.

(56) References Cited

U.S. PATENT DOCUMENTS

| | | | |
|---|---|---|---|
| 4,853,841 A | 8/1989 | Richter | |
| 5,818,348 A | 10/1998 | Walczak et al. | |
| 7,193,504 B2 * | 3/2007 | Carrender et al. | 340/10.4 |
| 7,253,717 B2 * | 8/2007 | Armstrong et al. | 340/10.2 |
| 2002/0152044 A1 | 10/2002 | Shanks et al. | |
| 2003/0133435 A1 | 7/2003 | Friedrich | |

FOREIGN PATENT DOCUMENTS

| | | |
|---|---|---|
| DE | 35 37 477 A1 | 4/1987 |
| DE | 42 24 508 A1 | 1/1994 |
| DE | 101 38 217 A1 | 3/2003 |
| DE | 103 35 003 A1 | 2/2005 |

OTHER PUBLICATIONS

Draft proposed American National Standard (ANSI T6 standard), 4. Part IV: UHF RFID Protocols that Support Part II, p. 4-1, Fig. 4-1. ISO/FCD 18000-6, pp. 10 and 17 (Figs. 7-9).

* cited by examiner

*Primary Examiner*—Brian A Zimmerman
*Assistant Examiner*—Omer S Khan
(74) *Attorney, Agent, or Firm*—Muncy, Geissler, Olds & Lowe, PLLC

(57) ABSTRACT

A method and apparatus includes at least one transponder or sensor to transmit useful data in an asynchronous mode to at least one reader. Before the start of the useful data transmission, the reader transmits a return link header to the transponder or sensor, which contains at least one bit length reference symbol as a reference time to define the bit length in the return link.

15 Claims, 3 Drawing Sheets

METHOD AND APPARATUS FOR IMPROVING WIRELESS DATA TRANSMISSION

This nonprovisional application claims priority under 35 U.S.C. § 119(a) on German Patent Application No. DE 102004014563.6, which was filed in Germany on Mar. 25, 2004, and which is herein incorporated by reference.

BACKGROUND OF THE INVENTION

1. Field of the Invention

The present invention relates to a method for improving transmission properties, such as a signal-to-noise ratio, in a return link in backscatter RFID or remote sensor systems, whereby at least one transponder or sensor transmits useful data in, for example, an asynchronous mode to at least one reader. Moreover, the invention also relates to an apparatus for wireless data transmission including at least one reader and at least one transponder or remote sensor being located in an electromagnetic field of the reader, whereby the reader is designed at least for sending and the transponder or sensor at least for receiving a header with transmission parameters.

2. Description of the Background Art

Automatic identification methods, also called auto-ID, have been widely used in recent years in many service sectors, in acquisition and distribution logistics, in commerce, in production, and material flow systems. The goal of auto-ID is, for example, the provision of information on persons, animals, objects, and products, etc.

An example of such auto-ID systems are chip cards, which are widely used today, in which a silicon memory chip, via mechanical-galvanic contacting using a reader, is provided with power, read out, and optionally can also be reprogrammed. In this case, the acquisition device is routinely called the reader, regardless of whether data can only be read thereby or also rewritten.

In RFID systems, the data carrier, e.g., the transponder, can be supplied with power not only through galvanic contact but also contactless through electromagnetic fields within the radio range (radio frequency: RF).

RFID systems typically have two basic components, namely, a transponder or a sensor in the case of a remote sensor system, i.e., an application-specific integrated circuit (IC) with a coupling element, such as a dipole antenna as a transmitter and receiver, and of a reader (also: base station), which typically has a high frequency module (transmitter-receiver) and also a coupling element. The reader provides the transponder or sensor, which usually does not have its own power supply, with power and a clock signal. Data is transmitted from both the reader to the transponder (forward link) and also in the opposite direction (return link). In this case, routinely before the start of the actual useful data transmission in the return link, a so-called return link header is transmitted by the transponder or sensor, which defines the transmission parameters of the return link, e.g., the modulation coding to be used or the like.

Such RFID systems, whose range is considerably greater than 1 m, work with electromagnetic waves in the UHF and microwave range. In this case, a backscattering method, called the backscatter principle because of its physical operating mode, is used predominantly, during the course of which a portion of the energy arriving at the transponder from the reader is reflected (backscattered) and in so doing is optionally modulated for data transmission. The IC receives, via the coupling element, a high frequency carrier, which it transmits by suitable modulation and backscattering devices partially back to the reader.

The RFID and remote sensor systems, outlined above and based on backscattering, generally have the disadvantage that the return link is very weak with respect to the power balance, primarily because of the free space attenuation both in the forward and return link. For this reason, attention must be focused especially in the design of such systems that a high signal-to-noise ratio (SNR) and thus a low bit error rate can be achieved.

A possible approach is the use of "synchronous return links," in which the reader at certain time intervals sends synchronization tags (notch signals), which define a bit length in the return link. Thereby, additional expenditure for circuitry is usually necessary, which has an unfavorable effect on the price of such systems. Moreover, during use of synchronous return links an interfering effect on other readers in the vicinity due to the unfavorable power balance is disadvantageous.

ISO standard 18000-6 FDIS, furthermore, describes systems with an asynchronous return link, in which a transponder or sensor transmits a "free" data stream without being affected by synchronization tags sent by the reader. Such asynchronous link mechanisms can be realized less expensively in UHF RFID systems than the aforementioned synchronous link mechanisms. Moreover, asynchronous methods possess advantages during use in RFID or remote sensor systems, which comprise a plurality of readers within a common range, because the noise contribution can be reduced by asynchronous operation.

For efficient data transmission in systems operating asynchronously, it is of exceptional importance that the transponder/sensor and reader operate at the same data rate. ISO standard 18000-6 FCD for this purpose discloses on page 17, FIG. 8, a return link header, which is intended to enable a reader to synchronize to the data rate of a transponder. For this purpose, the header contains a specific sequence, uniform over time, of modulation states (on/off). The ANSI T6 standard (page 4-1, FIG. 4-1) shows another example of such an approach.

To keep the signal-to-noise ratio of the link tolerable, a relatively stable baud rate is necessary during asynchronous transmission. This is derived from an on-chip oscillator disposed in the transponder or sensor, which oscillator, however, routinely has manufacturing-related tolerances with respect to its oscillation periods. Nevertheless, to be able to achieve the values defined, for example, in ISO 18000-6 FDIS (page 10, input tag:9/tag:9a) (40 kbit/s with ±15% tolerance), additional circuit costs (use of different current reflectors) for the purposes of equalization are necessary in such prior-art solutions, because the expected process tolerances of free running RC oscillators are far greater.

Moreover, the tolerances in a routinely sought low-power design of oscillators increase. Conventional systems achieve the desired accuracy, which is necessary, among others, for detecting collisions in the protocol (more than one transponder or sensor sends a data stream to the reader) or to reduce the time windows in Aloha-based anticollison methods (see, e.g., Finkenzeller, RFID-Handbuch, $3^{rd}$ ed., Hanser, pp. 290ff, which is herein incorporated by reference), by storing a correction value in a permanent read-only memory, whereby this value is then repeatedly read out preferably after a power-on-reset (POR) and supplied to a matching circuit (current reflector switching-over). A relative frequency accuracy can be maintained in this manner. The thus obtained oscillator clock signal when the return link is activated is fed to, e.g., a power splitter, which then, by suitable wiring, generates limit tags for the data transmission to the reader at the desired baud rate.

In the adjustment procedure of the aforementioned type, it is to be regarded as a particular disadvantage that storing additional bits uses scarce disk space. In addition, the aforementioned readout and adjustment procedures require time and cause additional activity (power consumption) on the transponder or sensor chip. Moreover, the necessary circuit measures require additional space and additional current, which has a negative effect both on the range of the link and also on the price of the transponder or sensor IC. Furthermore, an additionally possible temperature drift of the oscillator is generally not taken into account: area- and current-intensive measures are again required to compensate for this. As a result, in prior-art systems the baud rate is thereby not stable, so that very low signal-to-noise ratios result for certain applications.

SUMMARY OF THE INVENTION

It is therefore an object of the present invention to provide a method and an apparatus, in that, before the start of the useful data transmission, a reader transmits a return link header to the transponder or sensor, which contains at least one bit length reference symbol as a reference time to define the bit length in the return link. To achieve the object, the apparatus can be provided with a comparator and controller in the transponder or sensor, which are designed for comparing a time with a reference time contained in the headers and for controlling a baud rate of a transmission from the transponder or sensor to the reader depending on the comparison result. By this means, the area-intensive circuit measures necessary in the conventional art to achieve a precise oscillator frequency are either totally unnecessary or—if such circuits are nevertheless present as an alternative—are at least shut down, so that corresponding current is saved. Moreover, in the transmission of time references, very high accuracies, which provide a good signal-to-noise ratio, can be achieved for the bit lengths. In this case, the accuracy of the link lies between, for example, one and two oscillator clock signals.

Another feature of the method of the invention provides that the reader, before transmission of the return link headers, sends at least one other control signal to the transponder or sensor, according to which the transponder or sensor aborts the data stream generation and waits for a receipt of the return link header. In particular, in this case, the transponder or sensor first sends within a specific time after the end of the forward link—as specified in the aforementioned ISO standard—a return link header it controls, the generation of which it aborts, however, if it is informed by receiving another control signal, for example, a gap, notch, or modulation dip signal, that there is an "intelligent" reader within the system. This type of device according to the invention is capable of achieving improvement of the transmission properties in the return link by transmitting a reader-controlled header.

The bit length reference signal in an example embodiment of the method of the invention can be used advantageously to set almost any baud rate for the useful data transmission of the transponder or sensor. Thereby, to set the baud rate a counter value of a counter can be compared with the reference time. According to this comparison, i.e., when the time represented by the counter value and a reference time are identical, the transmission of a current useful data bit can be ended, the counter can then be reset, and the transmission of the next useful data bit can be started.

The comparator and controller can have a counter, whereby, according to a comparison of a counter value of the counter and a reference time, a bit length control signal is generated by the comparator and controller to end the transmission of a useful data bit of the transponder or sensor, to reset the counter, and to begin transmission of a next useful data bit.

The counter can be designed as a simple up or down counter or alternatively as a counter loadable with a value corresponding to the reference time, by which the bit length control signal can be generated after a number of counting events correspond to a loaded value.

In order to be able to economize in the following protocols for further improvement of the transmission properties and even the times for transmitting the header, at least the reference time can be stored in the transponder or sensor. This makes it possible that no return link header has to be transmitted for subsequent transmissions and that the stored reference time can be used to set the baud rate. A memory can also be provided in the transponder or sensor to store at least the reference time.

According to another example embodiment, the reference time for the bit length is selected such that the reader transmits a further control signal (e.g., a notch signal) before the reference time has elapsed. In this way, there is a very simple possibility for an alternative realization of an asynchronous return link with which a maximum signal-to-noise ratio can be regularly achieved. On this basis, upon receipt of the further control signal the counter can be reset and the transmission of the next useful data bit can be started, whereas if the further control signal is not received the useful data transmission by the transponder or sensor is ended, i.e., if no further control signal is received by the transponder or sensor during the reference time, this functions as an EOT signal (end-of-transmission).

In a further example embodiment, the counter can be reset or reloaded additionally by another reader control signal that is received within the reference time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
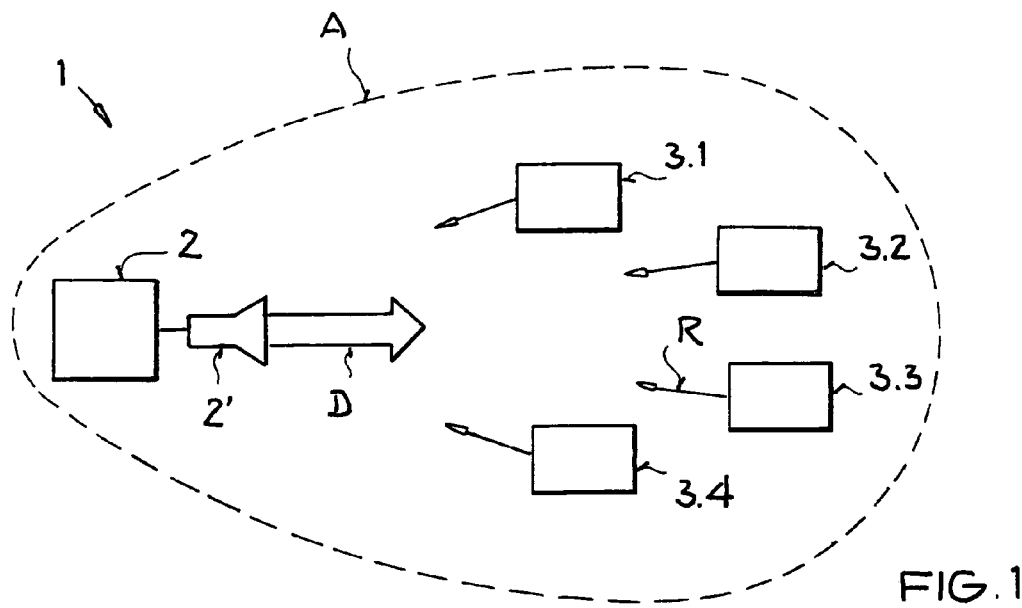
FIG. 1 is a schematic view an apparatus according to an example embodiment of the present invention.

FIG. 1 shows an RFID system 1 including a reader 2 in conjunction with a suitable transmitter and receiver 2', such as a dipole antenna, and a plurality of transponders 3.1-3.4, which together are located within a response range A of the reader 2. Although only transponders are discussed in the following description, the present invention can also be used in, for example, remote sensor systems, in combined sensor-transponder systems, etc.

A data stream D, which can be transmitted by the reader 2 or the transmitter 2', is received substantially simultaneously by the transponders 3.1-3.4.

The data transmission from the reader 2 to the transponders 3.1-3.4 is described below as a forward link. The transponders 3.1-3.4 respond at least to a completed data transmission from the reader 2 via return links R, whereby some of the energy coming in from the reader 2 together with the data D at transponder 3.1-3.4 is reflected (backscattered) and thereby is optionally modulated for data transmission from one of the transponders 3.1-3.4 to the reader 2. During use of, for example, a full duplex system, data transmission to the reader 2 can also occur even during the forward link.

Figure 2:
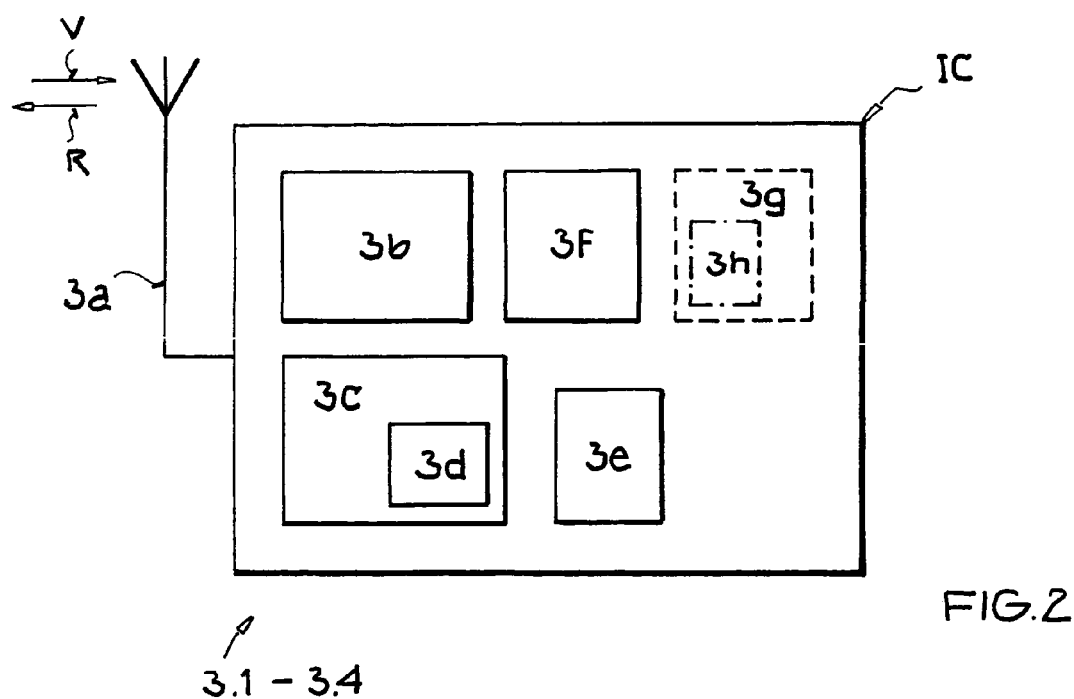
FIG. 2 illustrates a basic structure of a transponder or sensor of the apparatus of FIG. 1.

FIG. 2 shows a schematic illustration of, for example, one of the transponders 3.1-3.4 of FIG. 1. The transponder 3.1-3.4 can have an integrated circuit IC, which has, in this example, a single external circuit in the form of an antenna 3a, e.g., a dipole antenna, through which the transponder 3.1-3.4 is capable of receiving a HF (high frequency) carrier signal from the reader 2. The integrated circuit IC can also include modulation and backscattering devices 3b, through which the transponder 3.1-3.4 is capable of transmitting, e.g., backscattering, a received carrier signal back to the reader 2 and uses this carrier signal for the transmission of its own data.

The transponder 3.1-3.4 can also further include a comparator and controller 3c, for controlling, for example, a baud rate of a transmission from the transponder 3.1-3.4 to the reader 2, which is discussed further below. The comparator and controller 3c can include a counter 3d, which can be designed as, for example, an up, down, or loadable counter. Furthermore, a memory 3e can be provided for storing at least individual data or data elements from the data stream D transmitted by the reader 2.

In addition, the integrated circuit IC of the transponder 3.1-3.4 can further include an on-chip oscillator 3f, for example, an RC oscillator, as an internal clock generator for the transponder and optionally, circuitry 3g or a switch 3h (shown by the dashed or dot-dashed lines), which can be used for active stabilization of a clock signal of the oscillator 3f due to fabrication tolerances and/or temperature effects or through which the circuitry 3g can be activated or deactivated.

Figure 3:
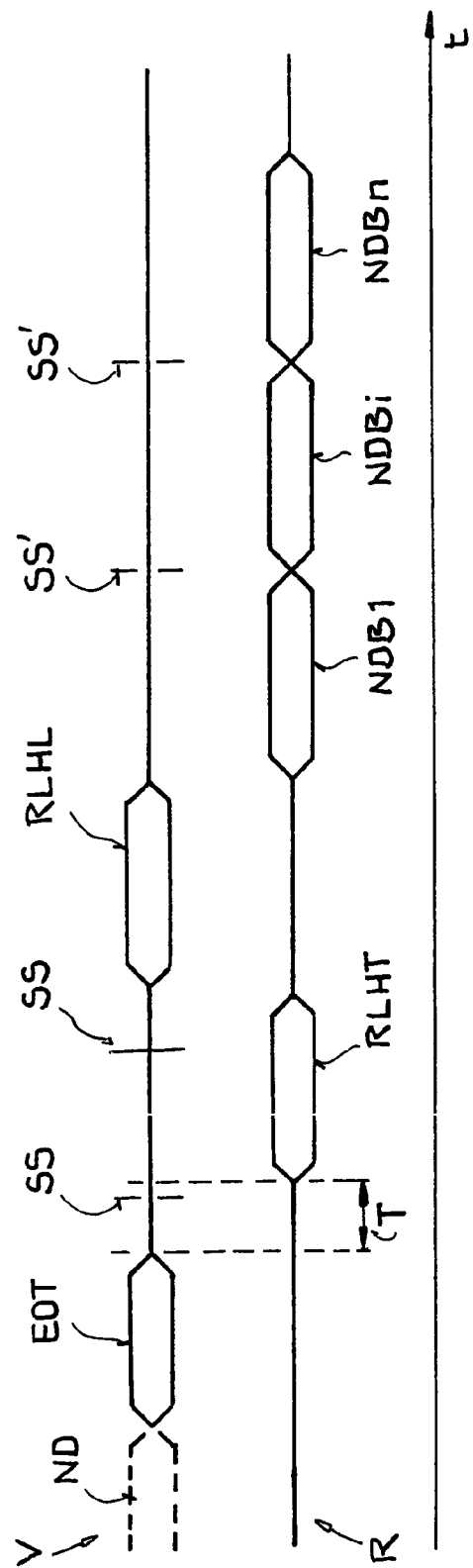
FIG. 3 is a timing diagram of a data transmission in a forward and return link according to an example embodiment of the invention.

FIG. 3 shows as an example of a data transmission in a forward link V and a return link R, shown in each case for time t. First, the reader 2 transmits its own useful data ND in the forward link V (shown as dashed lines), such as program data or the like, to at least one of the transponder(s) 3.1-3.4, followed by an EOT symbol, which indicates the end of data transmission in the forward link V. After the EOT symbol from the forward link V is detected by the transponder, the transponder sends (which can be sent after a specific time T, as specified in the aforementioned ISO standard) an agreed upon transponder-controlled header RLHT for the return link R, e.g., a return link header, which contains, for example, references for modulation coding in the return link, etc.

According to the invention, the reader now sends or the transponder receives during the time T or during the transmission of the return link header RLHT a control signal SS from the reader; in FIG. 3, the first of these two alternatives is shown as a dashed vertical line SS and the second alternative as a solid vertical line SS. The control signal SS can be, for example, a field gap, a notch signal, or a modulation dip. In the case of the second aforementioned alternative, the transponder 3.1-3.4 ends its data stream generation, as shown. In both cases, the transponder 3.1-3.4 learns from the control signal SS that an intelligent reader 2, i.e., a reader at least with abilities for active adjustment of the return link, is present in the system 1, and the transponder 3.1-3.4 waits for the receipt of an additional reader-controlled return link header RLHL, after which it begins with its transmission of an initial useful data bit NDB1 to the reader 2.

Figure 4:
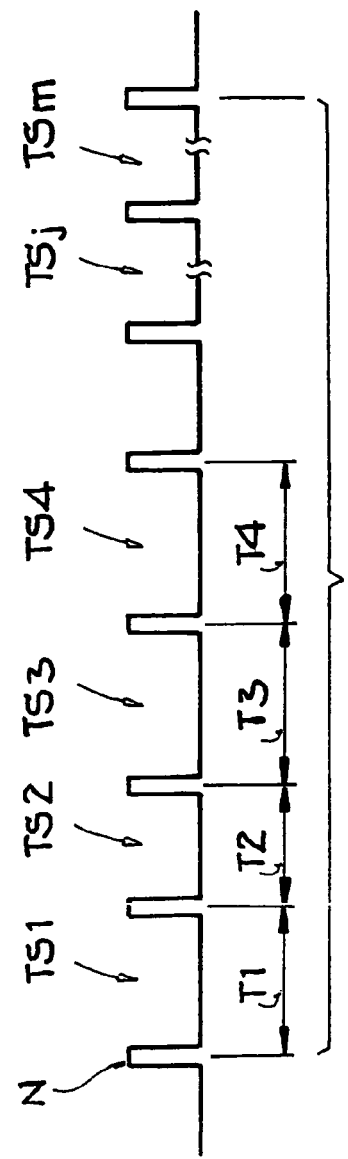
FIG. 4 shows an example of an additional return link header of FIG. 3.

The additional header RLHL, which is shown only as a data block in FIG. 3, is shown in further detail in FIG. 4. The additional header RLHL, which can be controlled by the reader 2, can have a series of m, m $\in \infty$, subsymbols TS1, . . . , TSm, whereby the individual subsymbols of the header RLHL can be defined by a time sequence of notch signals N, each of which can have a time interval T1, T2, T3, . . . . Through the transmission of the previously defined return link header RLHL, the transponder can receive, inter alia, the message:

whether the return link R should proceed synchronously or asynchronously. This setting can be made, for example, by a relative time duration of two subsymbols TS2, TS3 (here primarily the presence of an asynchronous return link is assumed initially);

how long a bit in the return link is. Thus a subsymbol, e.g., subsymbol TS4, or its time duration T4, can function as a bit length reference time;

in which modulation coding the data stream is to be transmitted to the reader 2 (e.g., NRZ, NRZI, FMO, 3phase1, or the like);

in which modulation type (ASK, PSK) that the data stream should be generated to the reader 2; and/or how many subsymbols (here: m) are transmitted as the return link header RLHL.

The transmission of (time) reference tags, particularly for the bit length, is possible according to the invention with very high accuracy in the range of one to two clock signals of the internal oscillator 3f, which can be used to improve the signal-to-noise ratio in the asynchronous return link using the bit length reference time (here: the duration T4 of the header subsymbol TS4). The transponder 3.1-3.4 can set almost any baud rate (bit clock signal) in the return link. For this purpose, a counter value Z of the counter 3d in the comparator and the controller 3c of the transponder 3.1-3.4 (FIG. 2), which according to the internal clock signal corresponds to a time t, is compared by the comparator and controller 3c with the reference time T4. Depending on the result of this comparison, for example, in the case of equality, a bit length control signal is generated in the comparator and controller 3c, through which the transmission of a useful data bit, e.g., the first useful data bit NDB1, as shown in FIG. 3, is ended and the transmission of the next data bit NDBi, i=2, . . . , n (n$\in \infty$), is started. This bit length control signal can be designated by a reference character SS' (dashed vertical lines in the right portion of FIG. 3). Furthermore, the bit length control signal SS' can be used to reset the counter 3d. If the counter 3d is a loadable counter, the counter 3d can be reloaded according to the bit length control signal SS' with the bit length reference time T4 or a counter value Z being derived therefrom, whereby, subsequently, a counter overflow or a reaching of a counter value of null generates an interrupt (according to the previously described bit length control signal SS'). In other words, after a number of counting events corresponding to the loaded values (the reference time T4), the bit length-control signal (SS') can be generated by the loadable counter.

With use of the memory 3e shown in FIG. 2, it is possible to store the reference time T4 or the assigned counter value Z permanently, as a result of which even the transmission times for the return link header can be economized in the following protocols.

Furthermore, the possibility of switching to a synchronous return link can be realized in a simple manner by a suitable setting of the reference time T4, in that the reader sends another control signal (notch signal or the like) before the elapse of the reference time T4; this is also designated in FIG. 3 (on right) with the reference character SS' due to the extensive equality of the action, whereby, however, it is basically not necessary that the other control signal SS' is received already after the first useful data bit NDB1 or generally after a specific useful data bit NDBi. In principle, the change in the synchronous mode, whereby a control signal SS' can be issued after the end of every additional useful data bit of the transponder, is possible at any time during the useful data transmission from the transponder to the reader. A subsequent absence of the additional control signal SS' is then interpreted by the transponder as an EOT for the return link. Thus, in particular a loop function of the data stream to the reader is made possible, as a result of which the signal-to-noise ratio can be further improved in the return link.

It remains to be emphasized, therefore, as a fundamental difference between the two types of control signals SS' described above that these are produced in the first case by the transponder 3.1-3.4 in the comparator and controller 3c (FIG. 2) and in the last case by the reader 2 to adapt the return link R.

Figure 5:
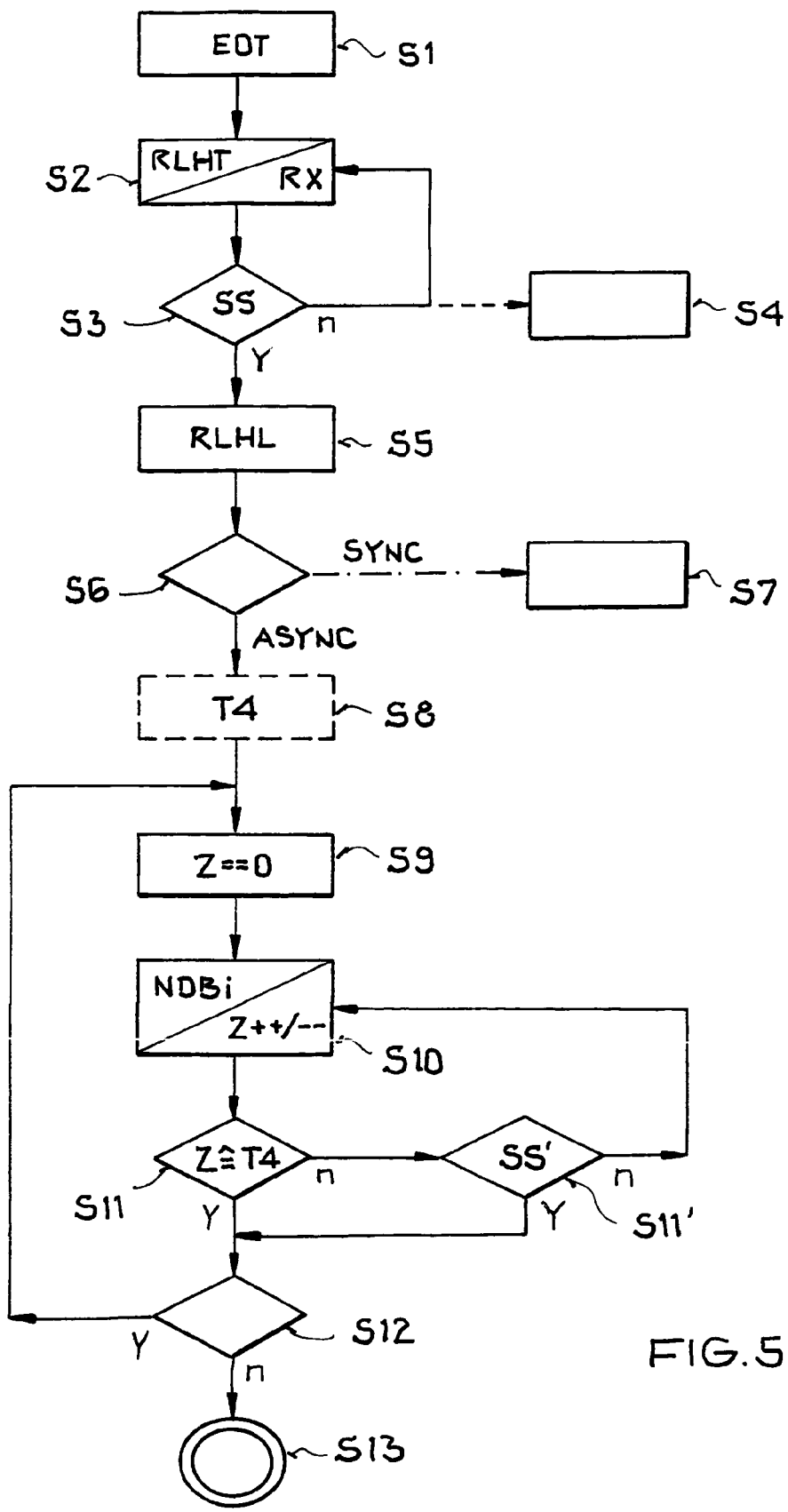
FIG. 5 is a flow chart according to an example embodiment of the present invention

Referring to FIG. 5, in step S1, the transponder receives the EOT symbol of the reader; next in step S2, optionally after waiting for a time T, a combined (substantially simultaneous) sending of the transponder-controlled return link header RLHT and receipt RX or waiting for a receipt of a control signal SS from an intelligent reader occurs. If, in this case, in a subsequent step S3 the answer to the query whether the control signal SS was received is no (n), the process thus returns in a loop manner back to step S2, before the transponder, after the elapse of a preset maximum waiting time, begins with a preset data transmission to the reader 2 (step S4; dashed arrow in FIG. 5).

In the case of a yes answer to the query (y) in step S3, the reader sends or the transponder receives in step S5 the reader-controlled return link header RLHL with at least one bit length reference symbol TS4 as the reference time T4 to define the bit length in the return link R, as explained above. This is followed in step S6 by another query whether the reader with the header RLHL had commanded a synchronous return link (step S7; dot-dashed arrow "SYNU" in FIG. 5) or an asynchronous return link R (arrow "ASYNC" in FIG. 5), for example, by a relative length of the subsymbols TS2, TS3 (see above). In a commanded asynchronous return link, according to an optional embodiment of the invention, the reference time T4 can be stored (step S8; broken line in FIG. 5). Thereafter, in step S9 the counter 3d is reset or reloaded and in step S10 the first/$i^{th}$ useful data bit NDB1/i is transmitted to the reader 2, whereby at the same time the counter value Z of the counter 3d is increased or reduced. A query (step S111) then follows whether the reached counter value Z corresponds to the reference time T4. If this is the case (y), then in step S12 another query is made whether further useful data bits NDBi are to be sent. If this is confirmed (y), the process returns to step S9, which corresponds to the generation of the bit length control signal SS', as described further above, by the transponder; otherwise (n), the return link and thereby the process end in step S13.

If in contrast the query is answered with no in step S11 (n: reference time T4 not yet reached), a further query is made (step S11') whether before the elapse of the reference time another control signal SS' was received from the reader. A no answer (n) to this query takes the process back to step S10; i.e., the current data bit is transmitted further. Otherwise (y), the bit transmission is ended and the process continued with step S12 (further data?).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for transmitting, the method comprising the steps of: transmitting from a reader to at least one transponder or sensor a return link header to the transponder or sensor, the return link header including at least one bit length reference symbol as a reference time to define a bit length in a return link; and transmitting useful data by the at least one transponder or sensor in an asynchronous mode, wherein the return link header is transmitted to the at least one transponder or sensor prior to the transmission of useful data by the at least one transponder or sensor;

wherein at least the reference time is stored in the transponder or sensor, and for subsequent transmissions, no return link header is transmitted and the stored reference time is used to set the baud rate.

2. The method according to claim 1, wherein the reader, before the transmission of the return link header, transmits at least one control signal to the transponder or sensor, according to which the transponder or sensor aborts a data stream generation and waits for the receipt of the return link header.

3. The method according to claim 1, wherein the at least one bit length reference symbol is used to set a baud rate for the useful data transmission of the transponder or sensor.

4. The method according to claim 3, wherein to set the baud rate, a counter value from a counter is compared with the reference time.

5. The method according to claim 4, wherein, on the basis of the comparison, the transmission of a useful data is ended, the counter is reset, and the transmission of a second group of useful data begins.

6. The method according to claim 1, wherein the reader transmits a control signal before the elapse of the reference time.

7. The method according to claim 6, wherein, upon receipt of a further control signal, the counter is reset and the transmission of a second group of useful data is begun.

8. The method according to claim 6, wherein, in the absence of the control signal, the useful data transmission is ended by the transponder or sensor.

9. An apparatus for wireless data transmission, the apparatus comprising:

at least one reader for transmitting a header having transmission parameters; and at least one transponder or remote sensor being located in an electromagnetic field generated by the reader, the transponder or remote sensor receiving the transmitted header from the reader, the transponder including a comparator and controller for comparing a time with a reference time, which is contained in the header, the header is a return link header including at least one bit length reference symbol as the reference time to define a bit length in a return link; and wherein at least the reference time is stored in the transponder or remote sensor, and for subsequent transmissions, no return link header is transmitted and the stored reference time is used to set the baud rate, wherein the transponder controls a transmission baud rate from the transponder or sensor to the reader on the basis of a comparison result of the time with the reference time.

10. The apparatus according to claim 9, wherein the comparator and controller further include a counter, and wherein according to a comparison between a counter value of the counter and the reference time by the comparator and controller, a bit length control signal is generated to end the transmission of a useful data bit of the transponder or sensor, to reset the counter, and to begin transmission of a next useful data bit.

11. The apparatus according to claim 10, wherein the counter is designed as a counter loadable with a value corresponding to the reference time, by which the bit length control signal can be generated after a number of counting events correspond to the loaded value.

12. The apparatus according to claim 10, wherein the counter is reset or reloaded by a further control signal transmitted by the reader and received within the reference time.

13. The apparatus according to claim 9, wherein the transponder or sensor further includes a memory for storing at least the reference time.

14. The method according to claim 1, wherein the useful data is transmitted from the at least one transponder or sensor to the reader.

15. The method according to claim 1, wherein the return link is provided in a backscatter RFID or remote sensor system.

* * * * *